3,457,275
1-(p-CHLOROBENZOYL)-2-METHYL-3-INDOLYL-
CARBOXYLYL HALIDES AND DERIVATIVES
John Martin Chemerda, Watchung, and Meyer Sletzinger,
North Plainfield, N.J., assignors to Merck & Co., Inc.,
Rahway, N.J., a corporation of New Jersey
No Drawing. Filed July 26, 1967, Ser. No. 656,023
Int. Cl. C07d 27/56
U.S. Cl. 260—326.13          4 Claims

ABSTRACT OF THE DISCLOSURE

This invention relates to 1-(p-chlorobenzoyl)-2-methyl-3-indolylcarboxylyl halides and the corresponding 3-α-diazoketone derivatives, both of which are useful as intermediates in the preparation of 1-(p-chlorobenzoyl)-2-methyl-3-indolylacetic acids.

---

This invention relates to a new method of preparing certain 1-p-chlorobenzoyl-2-methyl-3-indolylacetic acid derivatives. More particularly, it relates to a method and intermediates for preparing compounds of the Formula I:

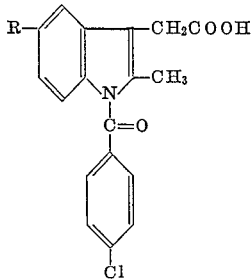

(I)

wherein R is methoxy or dimethylamino. These compounds are disclosed and claimed in U.S. Patent 3,161,654, issued Dec. 15, 1964, to Shen.

In the Shen patent, 1-p-chlorobenzoyl-2-methyl-3-indolylacetic acids are prepared by a series of reactions in which a 2-methyl-3-indolylacetic acid is dehydrated to the corresponding anhydride; the anhydride is treated with t-butyl alcohol to give the corresponding ester; the t-butyl ester is then acylated at the 1-position with p-chlorobenzoyl chloride; and the resulting 1-acylate is converted to the free acetic acid derivative by a pyrolysis process. It is an object of this invention to provide a new method and new intermediates for the preparation of these compounds.

In accordance with this invention, it has been discovered that 1-p-chlorobenzoyl-2-methyl-3-indolylacetic acids of Formula I can be prepared by converting a compound of the Formula II:

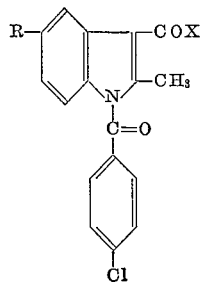

(II)

wherein R is as above defined and X is halo (e.g., chloro, bromo, or iodo) to a derivative of the Formula III:

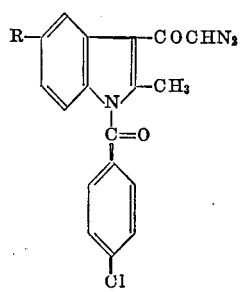

(III)

and then rearranging a compound of Formula III to yield a desired compound of Formula I.

In order to practice the present invention, the acid halide of Formula II, preferably in an inert solvent such as ether, acetone or the like, is treated with a solution of diazomethane in a solvent such as ether, preferably one mole of the diazomethane being used for each mole of the acid chloride. The reaction is advantageously conducted at ambient temperatures, although either lower or higher temperatures can be alternatively used. When R is dimethylamino, the hydrogen halide salt of the compound of Formula II may be used as the starting material for this reaction.

When the reaction mixture of the acid halide of Formula II and diazomethane has stood at ambient temperatures for several hours, the solvent can be removed in vacuo, leaving a residue which contains the 3-α-diazoketone derivative of Formula III. The latter can be dissolved in a solvent such as an aqueous alcohol and the solution can then be treated with an agent which is capable of rearrangeing the diazoketo group to an acetic acid side chain. A suitable rearranging reagent for this purpose is a soluble silver salt such as silver acetate or silver benzoate. The hydrolysis can be conducted in the presence of a tertiary amine such as trimethylamine or triethylamine.

The rearrangement proceeds at temperatures between the freezing and the boiling points of the reaction mixture. However, for practical purposes, it is best to conduct the reaction at the reflux temperature of the solution. After refluxing the reaction mixture for a period sufficient to permit the desired rearrangement to take place, e.g., for 15 minutes to about 3 hours preferably one hour, the solution can be filtered and the filtrate acidified with an acid such as hydrochloric acid or acetic acid. The precipitate is filtered off and recrystallized from an alcohol such as t-butanol to give the desired indolylacetic acid of Formula I.

The acid halide of Formula II which is used as the starting material herein can be obtained from the known compounds 2-methyl-3-carboxy-5-R-indole (IV) wherein R is as defined above, by a process which is outlined below. Thus, the 3-carboxy compound is treated under pressure with isobutylene in the presence of an acid to thereby form the corresponding tertiary butyl ester (V). The ester is acylated at the 1-position with 1-p-chlorobenzoyl chloride and sodium hydride, giving 1-p-chlorobenzoyl-2-methyl-5-R-3-carboxyindole tertiary butyl ester (VI) which is hydrolyzed to the 3-carboxy compound (VII) and then converted to the acid halide (II) by treatment with oxalyl chloride to the corresponding bromide or iodide. This series of reactions is shown by the following equations:

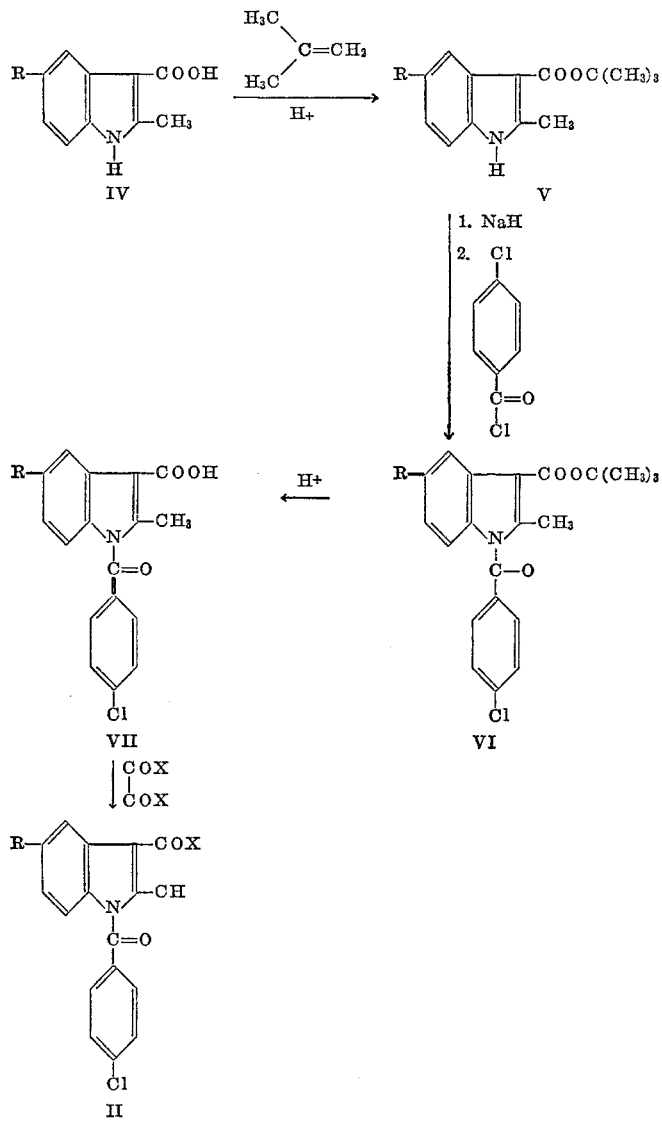

The following examples are presented to further illustrate the present invention.

Example 1

2-methyl-3-carboxy-5-methoxyindole (20 g.) (A. N. Grinev et al.: Zhur. Obscher Khim. 27, 1690–3; C.A. 52, 3762d), 250 ml. of methylene chloride, 40 g. of liquid isobutylene and 1 ml. of concentrated sulfuric acid are charged into a 500 ml. glass-lined autoclave, and the reaction mixture is shaken for 60 hours at room temperature. The reaction mixture is poured into 150 ml. of ice-cold water containing 4 g. of sodium carbonate. After 10 minutes of stirring, the organic layer is separated, washed with water, dried over magnesium sulfate and concentrated in vacuo. The solid residue is recrystallized from isopropanol to give t-butyl 2-methyl-5-methoxy-3-indolylcarboxylate.

Example 2

To a slurry of 2.8 g. sodium hydride in 30 ml. of anhydrous dimethylformamide is added 26.2 g. of t-butyl 2-methyl-5-methoxy-3-indolylcarboxylate in 100 ml. of dimethylformamide at 0° to 10° C. under nitrogen over 30 minutes, then 19 g. of p-chlorobenzoyl chloride is added dropwise over 20 minutes, maintaining the temperature between 0° and 10° C. by external cooling. After the addition is completed, the mixture is aged for one additional hour, then quenched into 400 ml. of ice-cold water containing 10 g. of acetic acid. The product is separated by extraction with toluene. The toluene extract is washed with water, dried over magnesium sulfate and concentrated to 100 ml. p-Toluenesulfonic acid (1.0 g.) is added to the toluene solution and heated to 90–95° C. with stirring in a nitrogen atmosphere for 2 hours. During this period of time, 2300 ml. of isobutylene is formed. The reaction mixture is cooled to 60° C. and washed once with 30 ml. of water containing 1.5 g. of sodium acetate. The toluene solution is dried over sodium sulfate and concentrated to approximately 30 ml. The solution is cooled to 0° C. and aged for 2 hours. The crystalline 1-p-chlorobenzoyl - 2-methyl-5-methoxy-3-indolylcarboxylic acid is filtered, washed with cold toluene and dried in vacuo.

Example 3

To a suspension of 3 g. of 1-p-chlorobenzoyl-2-methyl-5-methoxy-3-indolylcarboxylic acid in 30 ml. of anhydrous ether is added 2.5 g. freshly distilled oxalyl chloride. A clear solution is formed in 30 minutes and is aged at room temperature for 8 hours. The solution is cooled to −10° C. The crystalline 1 - p-chlorobenzoyl-2-methyl-5-methoxy-3-indolylcarboxylyl chloride is filtered, washed with cold (—10° C.) ether and used directly for the following example.

The corresponding carboxylyl bromide or iodide is obtained by using oxalyl bromide or oxalyl iodide, respectively, in place of the oxalyl chloride used in Example 3.

Example 4

1 - p-chlorobenzoyl - 2 - methyl-5-methoxy-3-indolylcarboxylyl chloride (5 g.) in 20 ml. of ether is added dropwise with stirring to 2.8 g. of diazomethane in 20 ml. of ether. The reaction mixture is aged for 12 hours, followed by the removal of ether in vacuo. The residue is dissolved in 50 ml. of 50% aqueous methanol. To the solution is added 0.5 g. of silver benzoate and 1.0 ml. of triethylamine and the solution is refluxed for one hour. The filtered solution is acidified with 2.0 ml. of acetic acid. The precipitated product is filtered and recrystallized from t-butanol to give 1-p-chlorobenzoyl-2-methyl-5-methoxy-3-indolylacetic acid.

Example 5

2-methyl-3-carboxy-5-dimethylaminoindole (20 g.), 250 ml. of methylene chloride, 40 g. of liquid isobutylene and 9.8 g. of concentrated sulfuric acid are charged into a 500 ml. glass-lined autoclave and the reaction mixture is shaken for 60 hours at room temperature. The reaction mixture is poured into 150 ml. of ice-cold water containing 12 g. of sodium carbonate. After 10 minutes of stirring, the organic layer is separated, washed with water, dried over magnesium sulfate and concentrated in vacuo. The solid residue is recrystallized from isopropanol to give t-butyl 2-methyl-5-dimethylamino-3-indolylcarboxylate.

Example 6

To a slurry of 2.8 g. sodium hydride in 30 ml. of anhydrous dimethylformamide is added 26.6 g. of t-butyl 2-methyl-5-dimethylamino-3-indolylcarboxylate in 100 ml. of dimethylformamide at 0° to 10° C. under nitrogen over 30 minutes. The reaction mixture is aged for 30 minutes, then 19 g. of p-chlorobenzoyl chloride is added dropwise over 20 minutes, maintaining the temperature between 0° and 10° C. by external cooling. After the addition is completed, the mixture is aged for one additional hour, then quenched into 400 ml. of ice-cold water containing 1.2 g. of acetic acid. The product is separated by extraction with toluene. The toluene extract is washed with water, dried over magnesium sulfate and concentrated to 100 ml. p-Toluenesulfonic acid (20.0 g. in 50 ml. of acetic acid) is added to the toluene solution and heated to 90–95° C. with stirring in a nitrogen atmosphere for 2 hours. During this period of time, 2300 ml. of isobutylene is formed. The reaction mixture is cooled to 60° C. and washed once with 30 ml. of water containing 10 g. of sodium acetate. The toluene solution is dried over sodium sulfate and concentrated to approximately 30 ml. The solution is cooled to 0° C. and aged for 2 hours. The crystalline 1-p-chlorobenzoyl - 2 - methyl-5-dimethylamino-3-indolylcarboxylic acid is filtered, washed with cold toluene and dried in vacuo.

Example 7

To a suspension of 3 g. of 1-p-chlorobenzoyl-2-methyl-5-dimethylamino-3-indolylcarboxylic acid in 30 ml. of anhydrous benzene is added 5 ml. of freshly distilled thionylchloride and the reaction mixture is heated at 70–75° C. for 2 hours with good agitation. The reaction mixture is cooled to room temperature and concentrated in vacuo to approximately 10 ml. After addition of 50 ml. of anhydrous ether, the precipitated 1 - p-chlorobenzoyl - 2-methyl-5-dimethylamino-3-indolylcarboxylic acid chloride hydrochloride is filtered off, washed with cold ether and used directly for the following example.

The corresponding carboxylyl bromide or iodide is obtained by using thionylbromide or thionyliodide, respecticevly, in place of the thionylchloride used in Example 7.

Example 8

1 - p-chlorobenzoyl - 2-methyl-5-dimethylamino-3-indolylcarboxylyl chloride hydrochloride (5 g.) in 20 ml. of ether is added dropwise with stirring to 2.8 g. of diazomethane in 20 ml. of ether. The reaction mixture is aged for 12 hours, followed by the removal of ether in vacuo. The residue is dissolved in 50 ml. of 50% aqueous methanol. To the solution is added 0.5 g. of silver benzoate and 3.0 ml. of triethylamine and the solution is refluxed for one hour. The pH of the filtered solution is adjusted to 5.5 to 6.0 by addition of acetic acid. The precipitated product is filtered and recrystallized from aqueous ethanol to give 1 - p-chlorobenzoyl-2-methyl-5-dimethylamino-3-indolylacetic acid.

We claim:
1. A compound of the formula:

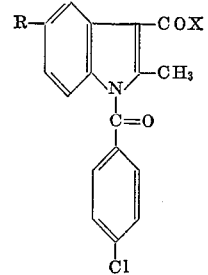

wherein X is chloro, bromo or iodo and R is either methoxy or dimethylamino.

2. The compound of claim 1 wherein R is methoxy.
3. A compound of the formula:

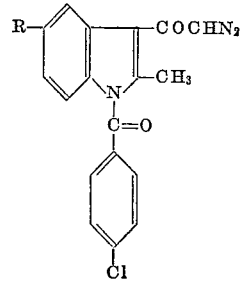

wherein R is methoxy or dimethylamino.

4. The compound of claim 3 wherein R is methoxy.

References Cited

UNITED STATES PATENTS 3,316,260   4/1967   Shen _____ 260—247.2

ALEX MAZEL, Primary Examiner

J. A. NARCAVAGE, Assistant Examiner

U.S. Cl. X.R.

260—326.14